United States Patent
Haraughty

(10) Patent No.: US 7,131,298 B1
(45) Date of Patent: Nov. 7, 2006

(54) BICYCLE LOCK WITH MULTIPLE CABLE LOOPS

(75) Inventor: James Haraughty, Monona, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 11/104,362

(22) Filed: Apr. 12, 2005

(51) Int. Cl.
E05B 73/00 (2006.01)

(52) U.S. Cl. .................. 70/18; 70/30; 70/49; 70/233; 70/58

(58) Field of Classification Search .................. 70/18, 70/30, 49, 456 R, 57, 58, 233–235
See application file for complete search history.

(56) References Cited

U.S. PATENT DOCUMENTS

| | | | |
|---|---|---|---|
| 3,738,132 A * | 6/1973 | Nagel | 70/49 |
| 3,827,773 A * | 8/1974 | Aiello | 312/100 |
| 3,965,709 A * | 6/1976 | Belke | 70/227 |
| 3,989,327 A * | 11/1976 | Candelaria | 312/100 |
| 3,996,775 A * | 12/1976 | Waldron | 70/234 |
| 3,999,408 A | 12/1976 | Kawakami | |
| 4,033,160 A | 7/1977 | Mima | |
| 4,037,441 A * | 7/1977 | Ray | 70/233 |
| 4,055,060 A | 10/1977 | Bellino | |
| 4,055,973 A * | 11/1977 | Best | 70/58 |
| 4,068,504 A | 1/1978 | Pickard | |
| 4,112,720 A | 9/1978 | Green | |
| 4,126,024 A | 11/1978 | Timmons et al. | |
| 4,186,576 A * | 2/1980 | Means et al. | 70/233 |
| 4,188,808 A | 2/1980 | Valdez | |
| 4,284,290 A | 8/1981 | Ragsdale | |
| 4,302,955 A | 12/1981 | Kawakami | |
| D263,039 S * | 2/1982 | Richard, Jr. | D12/115 |
| 4,460,093 A * | 7/1984 | Otema | 211/4 |
| 4,512,168 A * | 4/1985 | Reitze | 70/456 R |
| 4,540,092 A * | 9/1985 | DeSantis | 211/4 |
| 4,571,965 A | 2/1986 | LeRoux | |
| 4,708,004 A | 11/1987 | Allen | |
| 4,807,453 A * | 2/1989 | Bernier et al. | 70/233 |
| 4,879,382 A * | 11/1989 | Effland et al. | 540/554 |
| 4,945,739 A * | 8/1990 | Prindle | 70/233 |
| 4,970,882 A | 11/1990 | Arrendondo | |
| 5,065,603 A | 11/1991 | Koke | |
| 5,154,072 A * | 10/1992 | Leyden | 70/18 |
| 5,197,310 A | 3/1993 | Pedersen | |
| 5,251,464 A | 10/1993 | Halter | |
| 5,291,765 A * | 3/1994 | Hoisington | 70/233 |
| 5,408,212 A * | 4/1995 | Meyers et al. | 340/427 |
| 5,440,904 A * | 8/1995 | Su | 70/18 |
| 5,473,917 A * | 12/1995 | Say | 70/49 |
| 5,505,064 A * | 4/1996 | Wang | 70/53 |
| 5,699,684 A * | 12/1997 | Sulin | 70/234 |

(Continued)

*Primary Examiner*—Suzanne Dino Barrett
(74) *Attorney, Agent, or Firm*—Boyle Fredrickson Newholm Stein & Gratz, S.C.

(57) ABSTRACT

An improved bicycle lock having multiple cable loops attachable to a single locking mechanism and a method for securing multiple portions of a bicycle to a fixed structure is disclosed. The bicycle lock includes a lock body that has multiple latching mechanisms for receiving a corresponding set of cable loops, with each cable loop having a locking pin for independently securing the loop to one of the latching mechanisms on the lock body. The lock body includes a single locking mechanism which is used for activating and deactivating all of the latching mechanisms on the lock body, and thereby releasing or locking all of the cable loops simultaneously. The lock further includes a bracket for storing the lock when not in use.

24 Claims, 3 Drawing Sheets

U.S. PATENT DOCUMENTS

| | | | |
|---|---|---|---|
| 5,706,679 A * | 1/1998 | Zane et al. | 70/18 |
| 5,718,134 A * | 2/1998 | Chang | 70/233 |
| 5,785,289 A | 7/1998 | Shieh | |
| 5,918,490 A * | 7/1999 | Lion | 70/58 |
| 5,937,678 A * | 8/1999 | Kuo | 70/18 |
| 6,332,345 B1 * | 12/2001 | Huang | 70/456 R |
| 6,349,575 B1 * | 2/2002 | Bentley | 70/18 |
| 6,470,718 B1 * | 10/2002 | Yang | 70/30 |
| 6,474,116 B1 * | 11/2002 | Lai | 70/25 |
| 6,526,785 B1 * | 3/2003 | Asenstorfer et al. | 70/49 |
| 6,619,084 B1 * | 9/2003 | Kuo | 70/233 |
| 6,637,244 B1 | 10/2003 | Haraughty | |
| 6,742,366 B1 * | 6/2004 | Lai | 70/58 |
| 6,813,914 B1 * | 11/2004 | Chen | 70/50 |

\* cited by examiner

BICYCLE LOCK WITH MULTIPLE CABLE LOOPS

BACKGROUND OF THE INVENTION

1. Field of the Invention

The present invention relates to locks and more specifically to locks finding particular but not exclusive utility for bicycles. More particularly, the present invention pertains to an improved cable lock and bracket for securing a cable lock to a bicycle both for storage and to secure the bicycle to a fixed object.

2. Discussion of the Prior Art

Bicycle locks include two primary types of locks. The first is a U-bolt type lock of the kind manufactured by Kryptonite Locks. The U-bolt type lock is essentially comprised of large, solid U-shaped bolt, which is typically made of hardened steel, and a padlock that attaches to the ends of the U-bolt. The lock is carried on the bicycle in a holder or bracket.

A second common type of bicycle lock is a cable lock. The cable is usually composed of twisted strands of steel wire. The cable wire is commonly encased in a plastic or rubber cover. The cable is normally coiled for convenience of storage. One end of the cable is permanently fixed to a lock body or casing. The second end of the cable includes a locking pin or bolt-like tip, which may be attached into and removed from the lock body when the locking mechanism is activated or deactivated. The locking mechanism typically includes a key operated lock, although some cable lock devices utilize a combination lock.

Various brackets exist in the bicycle market for both types of locks. These brackets are conventionally attached to the bicycle frame by a bolt.

The above-described conventional locks are normally capable of securing only one portion of the bicycle to a fixed structure. For example, the conventional U-bolt type lock is normally used to secure one of the bars or stays of the frame, such as the seat stay, to a light post or other fixed structure. The principal component of the lock, namely, the U-bolt, is simply not big enough to secure other components of the bicycle, such as the front wheel. Similarly, a conventional cable lock is also normally used to secure the frame, and perhaps one of the wheels, typically the rear wheel. The cable on a conventional cable lock is normally not long enough to secure the frame and both wheels, and even if it were, such a long cable would add weight and be unduly cumbersome to store when not in use.

Modern bicycles are often provided with quick-release mechanisms for the wheels and other portions of the bicycle, such as the seat. If only one portion of the bicycle is secured with a conventional U-bolt or conventional cable lock, the other portions of the bicycle remain exposed to theft. Accordingly, an improved and convenient apparatus and method for securing multiple portions of a bicycle to a fixed structure is desired.

SUMMARY OF THE INVENTION

An improved bicycle lock having multiple cable loops attachable to a single locking mechanism and a method for securing multiple portions of a bicycle to a fixed structure is disclosed. The present invention is embodied in an improved lock body that has multiple lock-latching mechanisms for receiving a corresponding set of cable loops, with each cable loop having a locking pin for independently securing the loop to one of the latching mechanisms on the lock body.

The lock body includes a single locking mechanism which is used for activating and deactivating all of the latching mechanisms on the lock body. The locking mechanism on the lock body preferably comprises a key operated lock, although a combination lock may be used. Thus by turning a single key, or alternatively by inputting a single combination, all of the multiple latching mechanisms can be activated.

The number of cable loops corresponds to the number of latching mechanisms. Preferably at least three cable loops are desired, which for most applications is enough to secure the frame, the front wheel and the rear wheel to a fixed structure. A cable loop is comprised of a length of steel cable, with a locking pin on one end of the cable and the other end formed into a loop. The cable is wrapped around a portion of the bicycle by inserting the first end with the locking pin through the loop on the second end in order to form a noose, and then inserting the locking pin into the one of the latching mechanisms on the lock body.

The invention further includes a bracket for storing the lock when not in use, with the bracket being secured to a support such as the seat stay or other tubular member of the frame.

Other aspects, features and details of the present invention can be more completely understood by reference to the following detailed description of the preferred embodiment, taken in conjunction with the drawings, and from the appended claims

BRIEF DESCRIPTION OF THE DRAWINGS

The drawings, which constitute a part of this specification and include an exemplary embodiment of the present invention, include the following.

DESCRIPTION OF THE PREFERRED EMBODIMENT

Figure 1:
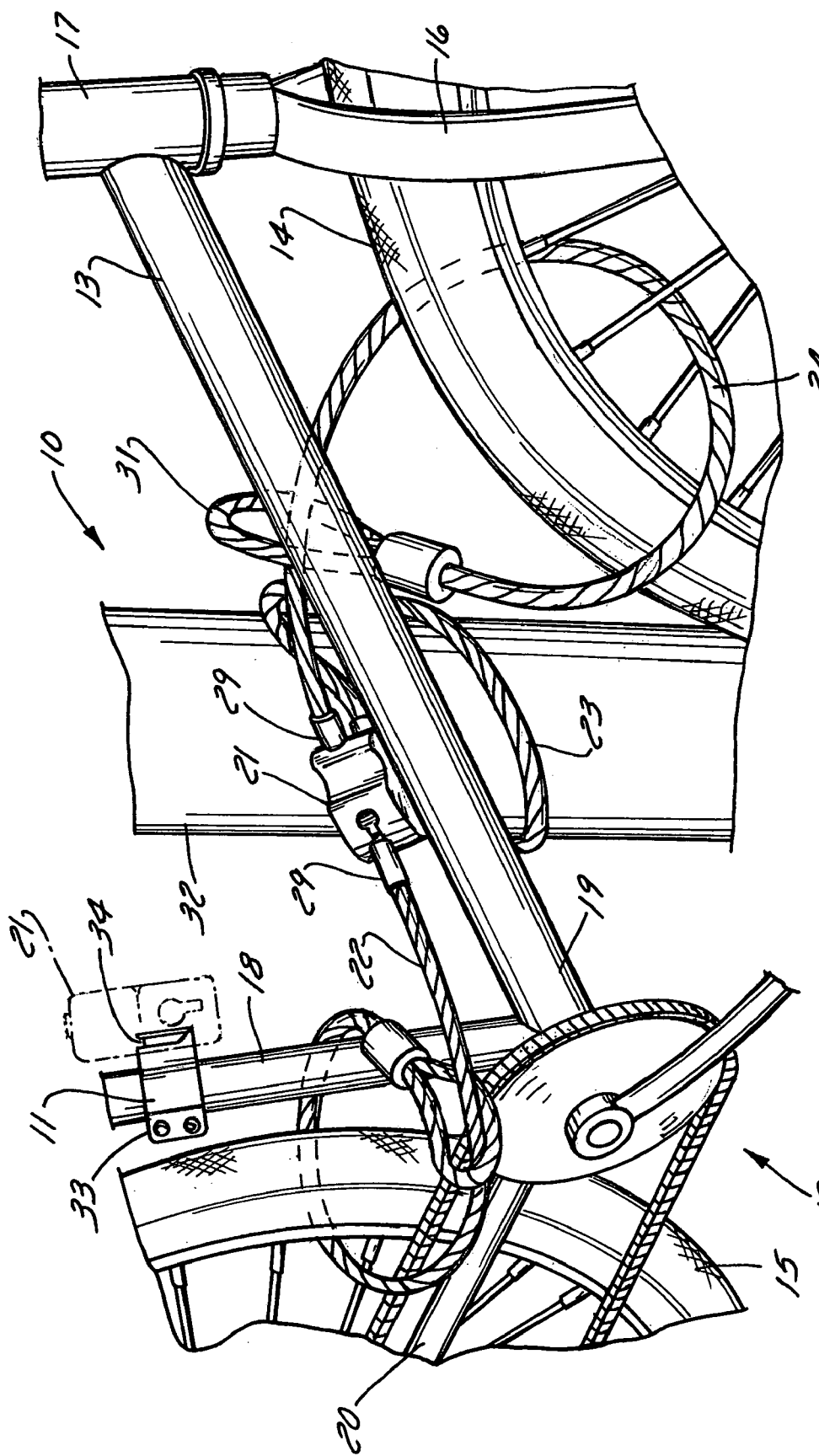
FIG. 1 is a perspective view of a bicycle having a bicycle lock with multiple cable loops embodying the present invention and illustrating its use for securing the bicycle to a fixed structure.
Figure 2:
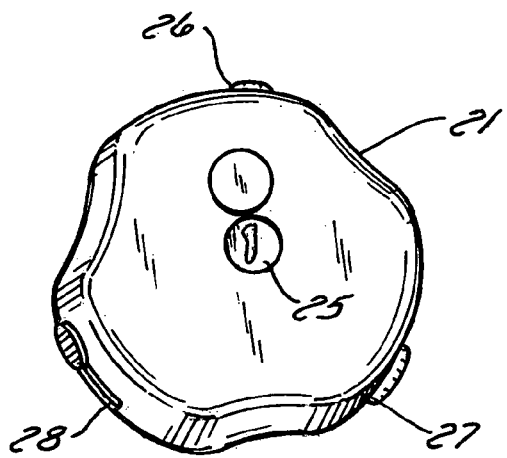
FIG. 2 is a top view of the bicycle lock of the present invention.
Figure 3:
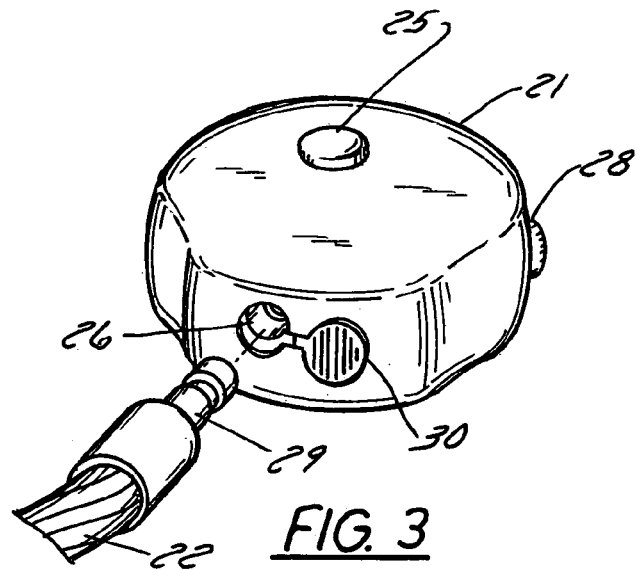
FIG. 3 is a side view of the bicycle lock.
Figure 4:
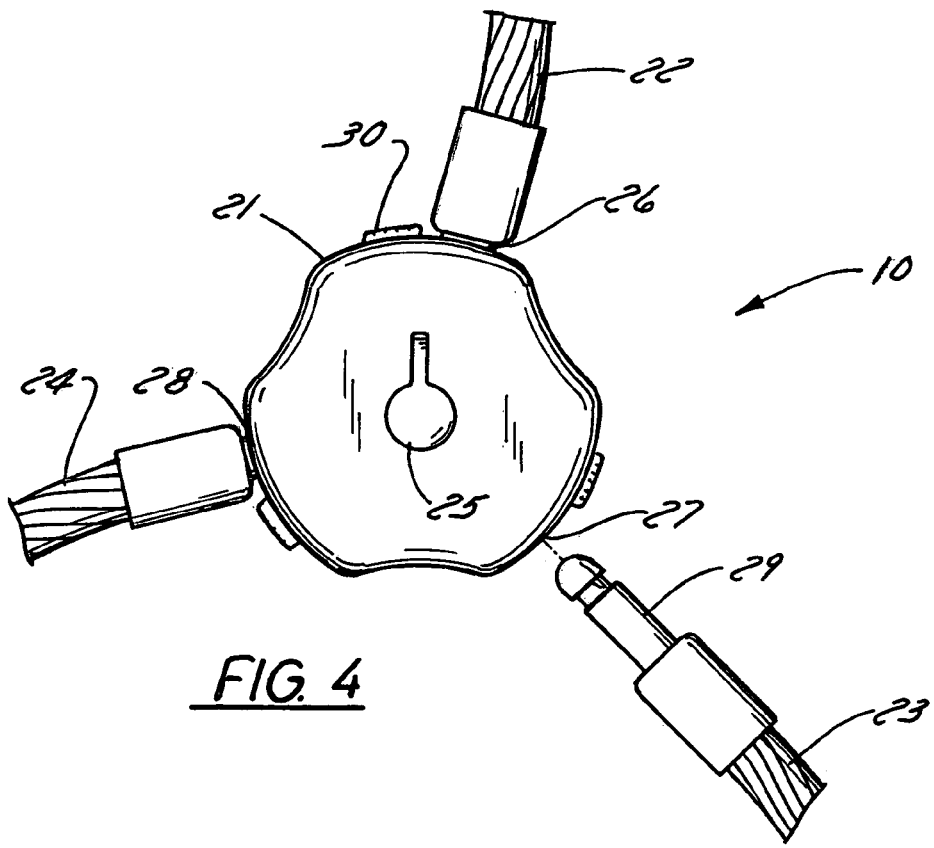
FIG. 4 is a top view of the bicycle lock and illustrating the attachment of multiple cable loops thereto.
Figure 5:
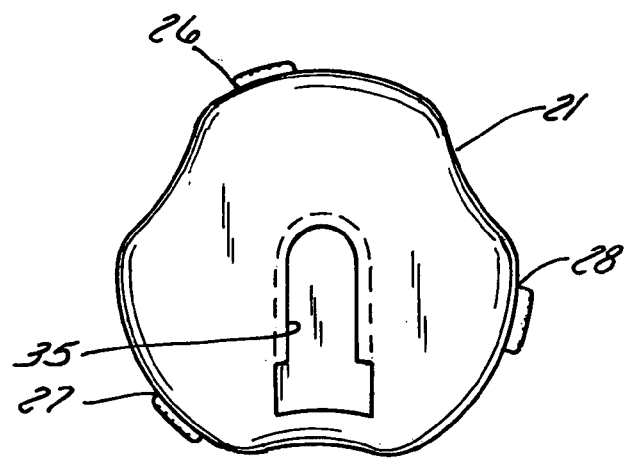
FIG. 5 is a bottom view of the bicycle lock.

The bicycle lock 10 and bracket assembly 11 embodying the present invention is shown in FIGS. 1–6. Referring to FIG. 1, a traditional, conventional two-wheeled bicycle 12 normally includes a frame 13, a front wheel 14, a rear wheel 15, a seat, pedals, a steering assembly comprised of a steering fork 16 and handlebar, and additional components such as a crank set, derailleur, hand brake, and so forth, which are commonly known. A conventional bicycle frame is normally constructed by an assembly of rigid tubular members which are typically comprised of a head tube 17 at the upper forward portion of the frame, a seat tube 18, a top tube, a down (or bottom) tube 19, and a bottom bracket at the lower portion of the frame. The head tube 17 of course supports the steering fork 16, on which the front wheel 14 is attached, and supports the handlebar for steering the bicycle. The seat tube 18 is used for adjustably supporting a seat, sometimes referred to as a saddle. The bottom bracket supports the pedals and chain drive mechanism for powering the bicycle. A conventional frame also normally includes a pair of chain stays 20 and a pair of seat stays for supporting the rear wheel 15.

The frame 12 is preferably constructed to have a vertical space along the seat tube 18 between the top tube and the bottom bracket, which is an ideal location for mounting the bracket 11 for storage of the lock 10 when it is not in use. Of course, there are other possible configurations and ways to describe the frame. The bracket 11 may be mounted on other convenient locations depending on the configuration of the frame.

Referring to FIGS. 1–6, the improved bicycle lock 10 of the present invention includes lock body 21 and a set of cable loops 22, 23 and 24. The lock body 21 illustrated in the figures has a somewhat flattened, generally cylindrical shape; however, other configurations may be employed.

The lock body includes locking mechanism 25 in the center of one of the faces of the cylindrical lock body 21, which activates and deactivates the lock. The locking mechanism 25 illustrated in the figures is a key operated lock, although a combination lock may be used.

The lock body 21 further includes a plurality of latching mechanisms 26, 27 and 28 for receiving a corresponding plurality of cable loops 22, 23 and 24. The latching mechanisms 26, 27 and 28, which are located around the periphery of the cylindrical lock body 21, each comprise an access port into which a lock pin 29 on one of the cable loops is inserted. When a lock pin 29 is inserted into the access port of the latching mechanism, it engages the internal components of the locking mechanism 25 within the lock body 21. Each latching mechanism 26, 27 and 28 preferably includes a cover member 30 for covering the access port to prevent moisture and debris from entering the lock body and to thereby protect the latching and locking mechanisms.

Figure 6:
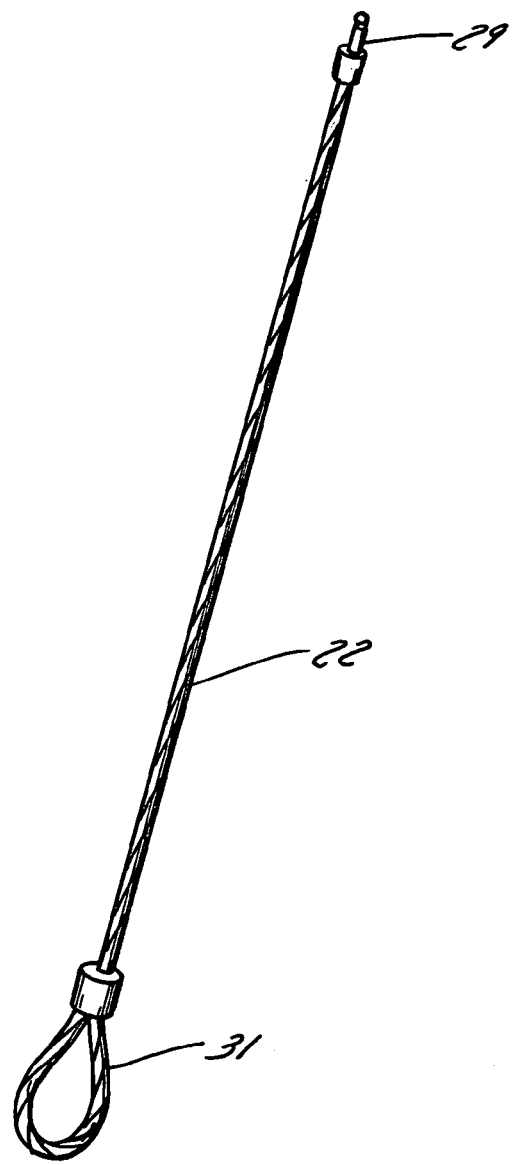
FIG. 6 is side view of one of the cable loops.

The improved bicycle lock 10 of the present invention further includes a plurality of cable loops, with the number of cable loops 22, 23 and 24 corresponding to the number of latching mechanisms 26, 27 and 28 on the lock body. Referring to FIG. 6, a cable loop 22 is comprised of a length of steel cable, with a locking pin 29 on one end of the cable and the other end formed into a loop 31. Accordingly, each cable loops may be independently secured by inserting its locking pin to one of the latching mechanisms on the lock body. Preferably, any one of the locking pins on any one of the cable loops may be inserted and secured to any one of the latching mechanisms on the lock body. Of course, the entire set of cable loops 22, 23 and 24 may be assembled to the lock by inserting one of the lock pins on the cable loops into each of the latching mechanisms 26, 27 and 28 on the lock body 21. Further, the single locking mechanism 25 on the lock body may be used for activating and deactivating all of the latching mechanisms 26, 27 and 28. Accordingly, and in accordance with one of the principal objects of the invention, multiple cable loops may be assembled and secured to a single lock body. The user thereby needs to activate only a single locking mechanism, i.e., turn or single key or input a single combination, in order use the lock.

The lock 10 illustrated in the figures includes three cable loops 22, 23 and 24 which may be assembled and secured to three complimentary latching mechanisms 26, 27 and 28 on the lock body 21, which for most applications is enough to secure the frame 13, the front wheel 14 and the rear wheel 15 to a fixed structure 32. A particular portion of the bicycle—whether it is the frame 13, front wheel 14, rear wheel 15, or any other portion or thing that the user desires to secure—may be secured by wrapping one of the cable loops 22 around desired portion of the bicycle to be secured and by inserting the first end with the locking pin 29 through the loop 31 on the second end to essentially form a noose, and then inserting the locking pin 29 into the one of the latching mechanisms 26, 27 or 28 on the lock body 21.

Multiple portions of the bicycle may be secured by repeating the above-described step. That is, multiple portions of the bicycle may be secured by the following method: providing a lock body 21 having a plurality of latching mechanisms 26, 27 and 28 activated by a single locking mechanism; providing a corresponding set of cable loops 22, 23 and 24, with each cable loop including on one end a lock pin 29 and the other end being formed into a loop 31; wrapping a first cable loop around a first portion of the bicycle and inserting the first end with the locking pin through the loop on the second end to essentially form a noose around said first portion of the bicycle, and then inserting the locking pin on the first cable loop into a first latching mechanisms on the lock body; wrapping a second cable loops around a second portion of the bicycle and then inserting the locking pin into a second latching mechanisms on the lock body; and repeating the wrapping step for as many cable loops as can be attached to the lock. Of course, the method further includes the step of activating said single locking mechanism 25 to release all of the cable loops 22, 23 and 24 attached to the lock body 21.

The invention further includes a bracket 11 for storing the lock 10 when not in use. The bracket 11 may be secured to a support such as the seat stay 18 or other tubular member of the frame. The bracket 11 is preferably comprised of a mounting flange portion 33 for securing the bracket to the bicycle, and a lock flange or slide 34. The lock body 21 includes a complementary recess 35, which slides over the lock flange 34 on the bracket, for releasably holding the lock 10. Of course, other types of brackets or means for attaching the lock in a releasable manner may be employed.

The present invention is designed especially for use in securing multiple portions of a bicycle to a stationary object 32, which may be a tree, a light pole, a fence or any type of bike rack. Bike racks for securing parked bikes come in all shapes and sizes and although they are often movable, they are heavy and awkward to move. For the purpose of securing a bicycle these bike racks are sufficiently immovable. Of course, any other heavy, fixed object may also be sufficient to secure a bicycle if the object will permit the cable loop to pass around or through it. The present invention may alternatively be used to secure non-bicycle items provided the item of a nature which permits the cable loop to wrap around or pass through it.

The bicycle lock disclosed presented herein has been described in specific reference to a preferred embodiment shown in the drawings. Specific details described above and illustrated in the drawings are naturally presented for descriptive purposes. Therefore, specific structural and functional details disclosed above are not to be interpreted as limiting the scope of the invention, but are presented merely as a basis for the claims and for teaching one skilled in the art to variously employ the present invention in any appropriate manner. Changes may be made in the details of construction, arrangement or operation of the invention without departing from the spirit of the invention.

I claim:

1. A bicycle lock comprising:
a lock body, said lock body including a single locking mechanism and a plurality of latching mechanisms activated by said single locking mechanism;
a corresponding plurality of cable loops, with each cable loop being comprised of a length of steel cable, with a locking pin on one end of the cable and the other end of the cable formed into a loop; and a bracket, said bracket being securable to a tubular support member on a bicycle, and said lock body being securable to said bracket;

wherein said locking pins on said cable loops may be independently inserted into any one of the latching mechanisms on the lock body, and all of the locking pins on the cable loops may be released by activating said single locking mechanism.

2. The bicycle lock of claim 1, wherein the plurality of latching mechanisms on the lock body includes at least two latching mechanisms, and the number of cable loops includes at least two cable loops.

3. The bicycle lock of claim 2, wherein the plurality of latching mechanisms on the lock body includes at least three latching mechanisms, and the number of cable loops includes at least three cable loops.

4. The bicycle lock of claim 3, wherein the locking mechanism on the lock body comprises a key operated lock.

5. The bicycle lock of claim 3, wherein the locking mechanism on the lock body comprises a combination lock.

6. An improved bicycle lock comprising a lock body, a plurality of cable loops, said plurality of cable loops being independently attachable to said lock body, and a bracket, said bracket being securable to a tubular support member on a bicycle, and said lock body being securable to said bracket wherein the lock body further comprises a plurality of latching mechanisms for receiving said corresponding plurality of cable loops.

7. The bicycle lock of claim 6, wherein the lock body further comprises a single locking mechanism for activating and deactivating all of the latching mechanisms.

8. The bicycle lock of claim 7, wherein the number of cable loops corresponds to the number of latching mechanisms on the lock body.

9. The bicycle lock of claim 7, wherein the plurality of latching mechanisms on the lock body includes at least two latching mechanisms, and the number of cable loops includes at least two cable loops.

10. The bicycle lock of claim 9, wherein the plurality of latching mechanisms on the lock body includes at least latching mechanisms, and the number of cable loops includes at least three cable loops.

11. The bicycle lock of claim 8, wherein the each cable loop is comprised of a length of steel cable, with a locking pin on one end of the cable and the other end formed into a loop.

12. The bicycle lock of claim 11, wherein each cable loop may be independently secured by inserting its locking pin to one of the latching mechanisms on the lock body.

13. The bicycle lock of claim 12, wherein any one of the locking pins on any one of the cable loops may be inserted and secured to any one of the latching mechanisms on the lock body.

14. The bicycle lock of claim 7, wherein the latching mechanisms each comprises an access port into which a lock pin on one of the cable loops is inserted, and a cover member for covering the access port.

15. The bicycle lock of claim 6, wherein the locking mechanism on the lock body comprises a key operated lock.

16. The bicycle lock of claim 6, wherein the locking mechanism on the lock body comprises a combination lock.

17. A method of securing a bicycle, said method comprising:

providing a lock body having a plurality of latching mechanisms activated by a single locking mechanism;

providing a corresponding set of cable loops, with each cable loop including on one end a lock pin and the other end being formed into a loop;

wrapping a first cable loop around a first portion of the bicycle and inserting the end with the locking pin through the loop on the other end to form a noose around said first portion of the bicycle, and then inserting the locking pin on the first cable loop into a first latching mechanism on the lock body;

wrapping a second cable loop around a second portion of the bicycle and then inserting the locking pin on the second cable loop into a second latching mechanism on the lock body; and storing the lock body by securing it to a bracket on the bicycle.

18. The method of clam 17, further comprising wrapping a third cable loop around a fixed structure and inserting the locking pin on the third cable loop into a third latching mechanisms on the lock body.

19. The method of claim 18, further comprising the step of activating said single locking mechanism to release all of the cable loops attached to the lock body.

20. A bicycle lock comprising:

a portable lock body, said lock body including a single locking mechanism and a plurality of latching mechanisms activated by said single locking mechanism;

a corresponding plurality of cable loops, with each cable loop being comprised of a length of steel cable, with a locking pin on one end of the cable and the other end of the cable formed into a loop;

wherein said locking pins on said cable loops may be independently inserted into any one of the latching mechanisms on the lock body, and all of the locking pins on the cable loops may be released by activating said single locking mechanism, further comprising a bracket said bracket being securable to a tubular support member on a bicycle, and said lock body being securable to said bracket.

21. The bicycle lock of claim 20, wherein the plurality of latching mechanisms on the lock body includes at least two latching mechanisms, and the number of cable loops includes at least two cable loops.

22. The bicycle lock of claim 21, wherein the plurality of latching mechanisms on the lock body includes at least three latching mechanisms, and the number of cable loops includes at least three cable loops.

23. The bicycle lock of claim 22, wherein the locking mechanism on the lock body comprises a key operated lock.

24. The bicycle lock of claim 23, wherein the locking mechanism on the lock body comprises a combination lock.

* * * * *